United States Patent
Gretz

(10) Patent No.: US 7,390,980 B1
(45) Date of Patent: Jun. 24, 2008

(54) SNAP ENGAGEMENT ELECTRICAL CONNECTOR WITH SPLIT CONNECTOR BODY

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 11/796,192

(22) Filed: Apr. 27, 2007

(51) Int. Cl.
  *H02G 3/18* (2006.01)
(52) U.S. Cl. .................. 174/657; 174/658; 174/666; 16/2.1; 285/218
(58) Field of Classification Search ......... 174/653–664, 174/152 G, 153 G, 151, 31 R, 91, 92, 93, 174/74 R; 248/56; 16/2.1, 2.2; 439/604, 439/471, 450, 460; 285/218, 154.4
See application file for complete search history.

(56) References Cited

U.S. PATENT DOCUMENTS

| | | | |
|---|---|---|---|
| 1,644,306 A * | 10/1927 | James | ................. 285/218 |
| 3,174,776 A | 3/1965 | Berger | |
| 4,150,250 A | 4/1979 | Lundeberg | |
| 4,880,387 A | 11/1989 | Stikeleather et al. | |
| 4,990,721 A | 2/1991 | Sheehan | |
| 4,995,647 A * | 2/1991 | Carey | ................. 285/149.1 |
| 5,090,644 A * | 2/1992 | Lenker | ................. 248/56 |
| 5,775,739 A | 7/1998 | Gretz | |

* cited by examiner

*Primary Examiner*—Dhiru R Patel

(57) ABSTRACT

A electrical connector for connecting conduit or cables to a junction box. The connector includes a tubular connector body with a longitudinal slot extending substantially along the length of the connector body and dividing the tubular connector body into an upper half and a lower half. A lateral slot extends through the upper half of the connector body at the leading end thereby hinging the upper half to the lower half at the trailing end of the connector. A tubular snap ring including one or more locking tangs is disposed and held thereon on the leading end of the connector body by a spring bias. The trailing body portion includes a threaded aperture and a threaded fastener therein. When inserted into a knockout in a junction box, the leading end of the snap engagement connector is held firmly but adjustably therein by engagement of the locking tangs with the panel, thereby allowing the orientation of the connector with respect to the box to be adjusted as desired. A conduit may then be inserted into the trailing end of the connector and secured therein by the fastener. Tightening of the fastener upon the conduit forces the upper half of the connector body away from the lower half and spreads the leading end of the connector body and the snap ring into tight engagement with the electrical panel.

13 Claims, 7 Drawing Sheets

SNAP ENGAGEMENT ELECTRICAL CONNECTOR WITH SPLIT CONNECTOR BODY

FIELD OF THE INVENTION

This invention relates to fittings or connectors for connecting electrical cables to an electrical box and specifically to an improved snap engagement electrical connector that includes a split connector body and a snap ring that provides a tighter initial connection with the electrical box.

BACKGROUND OF THE INVENTION

Snap fitting electrical connectors are popular as a means of connecting cables to electrical junction boxes. Typically, the snap fitting connectors include a solid connector body adapted on the leading end to snap into a knockout in a panel or junction box and adapted on the trailing end to receive a conduit or cable to be secured thereto.

Although many snap engagement electrical connectors are available for connecting electrical cables or conduit to electrical junction boxes, they typically include solid connector bodies. When snapped into the knockout, the connector is connected rigidly with respect to the junction box thereby making it impossible to change the orientation of the connector with respect to the box. However, in many situations, such as where space around the box is severely restricted, the installer must change the orientation of the connector with respect to the box, and for a solid connector body this is not possible.

U.S. Pat. No. 5,775,739, having common ownership and inventorship as the present invention, presented a connector for fastening electrical metal tubing to junction boxes. The connector included wedge holding tabs integral with and extending from the nose portion of the connector for forming a tight and secure fit with the junction box after the fastening screw was tightened.

Although the electrical connector of U.S. Pat. No. 5,775,739 forms a tight fit with a junction box once the fastening screw is tightened, the tabs, being integral with the nose portion of the connector and formed of a non-resilient die-casting alloy, formed a loose initial fit when first pressed into the junction box. As a result, prior to tightening the connector with the fastening screw, unintended contact with the connector could lead to an undesirable change in orientation of the connector with respect to the junction box.

Therefore, what is needed is a snap engagement electrical connector that may be inserted within a knockout of an electrical box with a firm but adjustable initial fit allowing the connector to be adjusted in orientation or rotated with respect to the electrical box prior to securing the electrical connector with respect to the box.

These and other advantages will become apparent by reading the attached specification and claims in conjunction with reference to the attached drawings.

SUMMARY OF THE INVENTION

The present invention is a snap engagement electrical connector for connecting conduit or cables to an electrical junction box. The connector includes a tubular connector body with a longitudinal slot extending substantially along the length of the connector body and dividing the tubular connector body into an upper half and a lower half. A lateral slot extends through the upper half of the connector body at the leading end thereby hinging the upper half to the lower half at the trailing end of the connector.

A tubular split snap ring including one or more locking tangs is disposed and held thereon on the leading end of the connector body by a spring bias. The trailing body portion includes a threaded aperture and a threaded fastener therein. When inserted into a knockout in a junction box, the leading end of the snap engagement connector is held firmly but adjustably therein by engagement of the locking tangs with the box. A conduit may be inserted into the trailing end of the connector and secured therein by the fastener. Tightening of the fastener upon the conduit forces the upper half of the connector body away from the lower half and spreads the leading end of the connector body and the snap ring into tight engagement with the junction box.

OBJECTS AND ADVANTAGES

The snap engagement electrical connector of the present invention includes several advantages over prior art split body connectors, including:

(1) By including a resilient snap ring with resilient locking tangs on the leading end of the snap engagement connector, the connector of the present invention is easily inserted into a knockout in a junction box. This provides an advantage over prior art connectors with wedge-shaped tabs that are rigid and integral with the die-cast connector body. The tabs on prior art connectors are not resilient, and the distance they extend from the die-cast body is therefore limited to enable the connector to enter the knockout.

(2) The snap engagement connector of the present invention may be adjusted after being snapped into the junction box. As a result of the resilient tangs of the snap ring engaging the wall of the junction box, the connector is held firmly but adjustably within the knockout of the junction box. The snap engagement connector therefore holds firmly within the knockout but may be rotated within the knockout to adjust the orientation of the connector with respect to the box. Prior art connectors having tabs form loose connections with the junction box making the prior art connectors prone to falling out of the knockout and limiting the ability to rotate the prior art connector with respect to the box without unintentionally popping the connector out of the knockout hole.

(3) The electrical connector of the present invention may be loosened after initial tightening to permit readjustment in the orientation of the connector with respect to the junction box. An advantage of the snap engagement connector is that, as a result of the snap ring and the resilient locking tangs, loosening of the connector does not cause the snap engagement connector to pop out of the junction box.

(4) The electrical connector of the present invention provides excellent electrical continuity between the conduit, the electrical connector, and the junction box it is secured to.

These and other objects and advantages of the present invention will be better understood by reading the following description along with reference to the drawings.

INDEX TO REFERENCE NUMERALS IN DRAWINGS

| | |
|---|---|
| 20 | snap engagement electrical connector |
| 22 | connector body |
| 24 | leading end |
| 26 | trailing end |
| 28 | snap ring |
| 30 | knockout hole |
| 32 | electrical box |
| 34 | bore |
| 36 | central axis |
| 38 | longitudinal slot |
| 40 | lateral slot |
| 42 | upper half |
| 44 | lower half |
| 46 | second lateral slot |
| 48 | hinge portion |
| 50 | leading end portion |
| 52 | central flange |
| 54 | leading flange |
| 55 | trailing flange |
| 56 | boss |
| 58 | threaded bore |
| 60 | fastener |
| 62 | leading body portion |
| 64 | trailing body portion |
| 65 | seat |
| 66 | locking tang |
| 70 | blank |
| 72 | outer cylindrical surface of snap ring |
| 74 | leading end of snap ring |
| 76 | trailing end of snap ring |
| 78 | free edge of locking tang |
| 82 | wall |
| 84 | conduit |
| 86 | inner side of wall |

DETAILED DESCRIPTION OF THE INVENTION

The present invention comprises a snap engagement electrical connector for easy snap engagement of an electrical cable or an electrical conduit to electrical junction box. Once connected into a knockout in the junction box, electrical continuity or grounding is provided between the connector, the inserted metallic cable or conduit, and the junction box. Although the snap engagement electrical connector is used primarily for connecting metallic sheathed cable or solid raceway systems such as conduit to either a panel or a junction box, for simplification purposes the description herein will refer to connection of metallic conduit or electrical metal tubing (EMT) to a junction box. The connector of the present invention could also be used to connect non metallic cable to a junction box by providing an end sleeve or protector to the end of the non metallic cable that is inserted into the connector.

Figure 1:
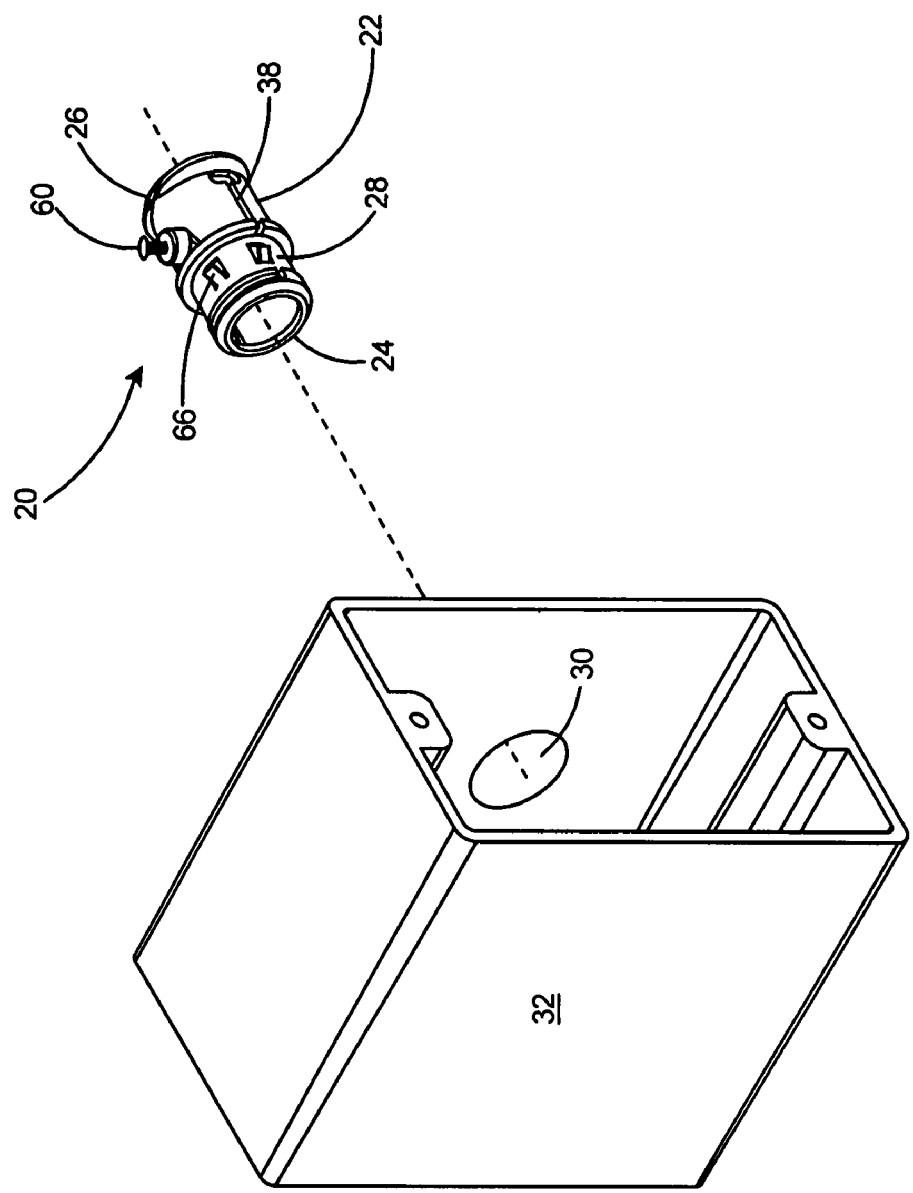
FIG. 1 is a perspective view of the preferred embodiment of a snap engagement electrical connector according to the present invention shown in alignment with the knockout of an electrical box into which it is to be inserted.

With reference to FIG. 1 there is shown a preferred embodiment of a snap engagement electrical connector 20 according to the present invention. The snap engagement connector 20 includes a tubular connector body 22 with a leading end 24 and a trailing end 26 and a tubular snap ring 28 disposed on the leading end 24. The snap engagement electrical connector 20 is shown in alignment with a knockout hole 30 in an electrical box 32 into which it will be secured.

Figure 2:
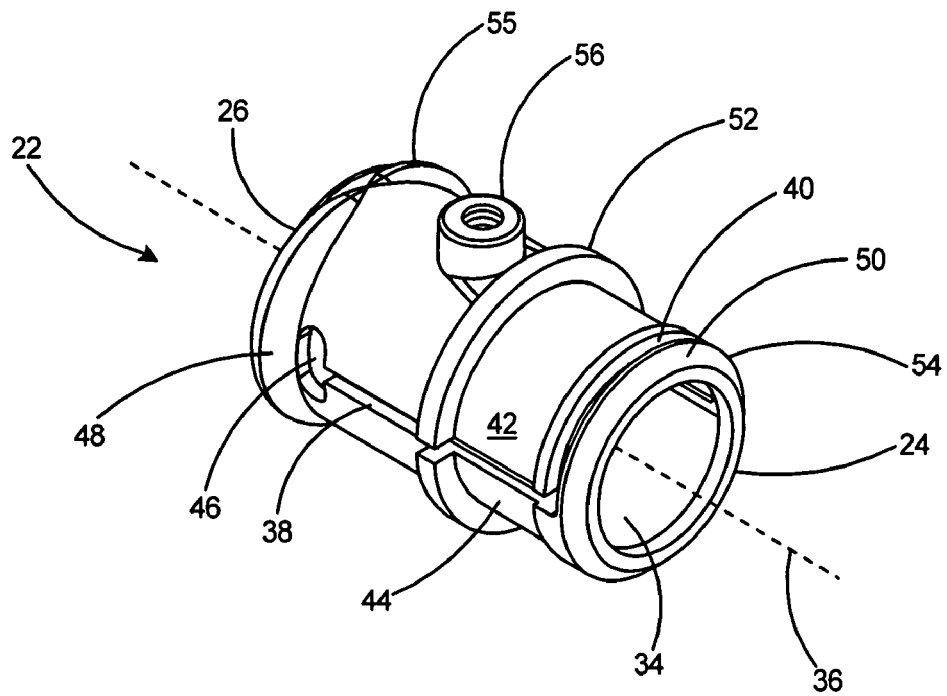
FIG. 2 is a perspective view of the preferred embodiment of a snap engagement electrical connector according to the present invention.
Figure 3:
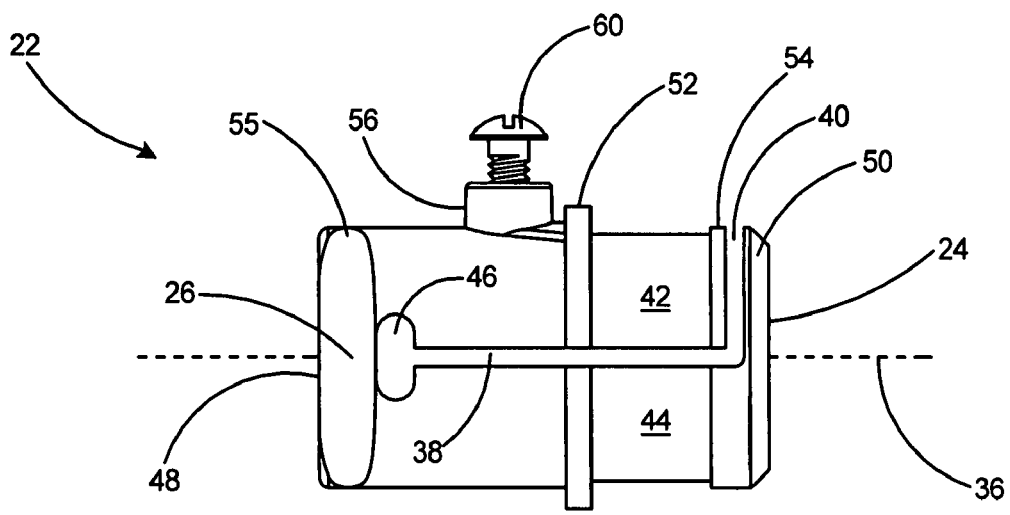
FIG. 3 is a side view of the snap engagement electrical connector of FIG. 2.

Referring to FIGS. 2 and 3, the tubular connector body 22 includes the leading end 24, the trailing end 26, and a bore 34 having a central axis 36 extending there through. A longitudinal slot 38 extends through a substantial portion of the connector body 22. A lateral slot 40 extends from the longitudinal slot 38 at the leading end 24 of the connector body 22 and extends through the top half of the connector body 22. The longitudinal slot 38 and lateral slot 40 divide the connector body 22 into an upper half 42 and a lower half 44. A second lateral slot 46, having a wider slot width than the lateral slot 40, is provided at the trailing end of the longitudinal slot 38. By providing the longitudinal slot 38, lateral slot 40, and second lateral slot 46, the connector body 22 is essentially hinged at hinge portion 48 so that the upper half 42 of the connector body 22 may be pivoted with respect to lower half 44 of the connector body 22 in a manner that will be described herein. The connector body 22 further includes a tubular leading end portion 50 forward of lateral slot 40, a central flange 52, and a leading flange 54. The snap engagement electrical connector 20 further includes a trailing flange 55 on the connector body 22 at the trailing end 26.

Figure 4:
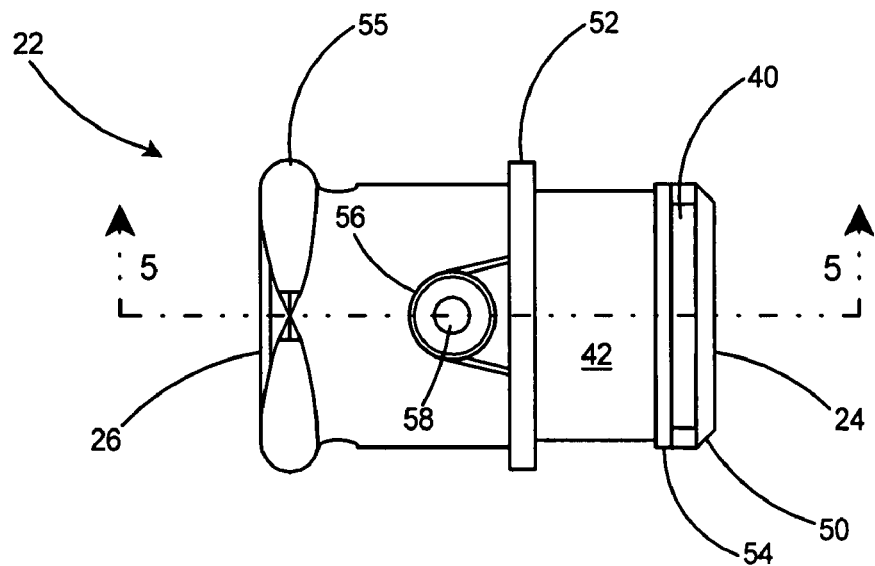
FIG. 4 is a top view of the snap engagement electrical connector of FIG. 2.

With reference to FIG. 4, the upper half 42 of the connector body 22 further includes a boss 56 with a threaded bore 58 therein. The connector body 22 is capable of receiving a fastener 60 (see FIG. 5) therein in the threaded bore 58 with the threaded bore 58 positioning the fastener 60 such that it will be orthogonal to the central axis 36 of the bore 34 of the connector body 22.

Figure 5:
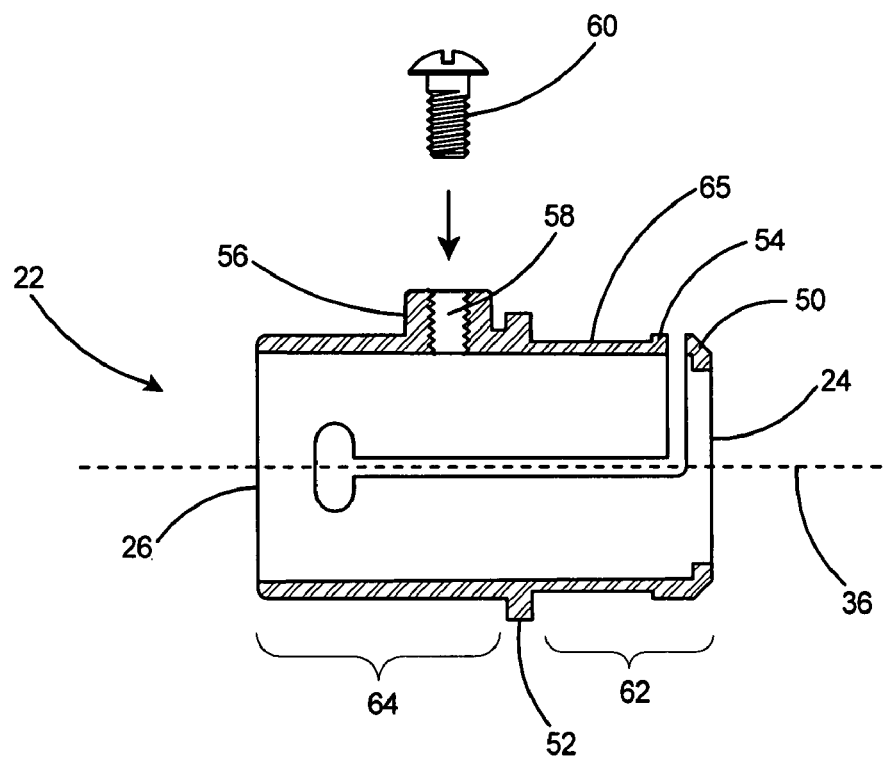
FIG. 5 is a sectional view of the snap engagement electrical connector taken along line 5-5 of FIG. 4.

As shown in FIG. 5, the central flange 52 divides the connector body 22 into a leading body portion 62 and a trailing body portion 64. The central flange 52 will act to limit the distance of insertion of the connector body 22 into a knockout hole as described herein. The leading end 24 of the connector body 22 includes a seat 65 between the leading flange 54 and central flange 52.

The tubular connector body 22 is preferably constructed of a conductive metal such as steel, zinc, galvanized steel, aluminum, or metal alloys. The connector body 22 of the present invention is typically formed by die-casting and die-casting alloys are the most preferred material of construction. A most preferred material of construction for the connector body is Zamak™, a casting alloy comprised mainly of zinc alloyed with aluminum, magnesium, and copper and available from Eastern Alloys, Maybrook, N.Y. By constructing the connector body of Zamak™ or other appropriate metals, the connector body will be electrically conductive and provide good continuity throughout the fitting.

Figure 6:
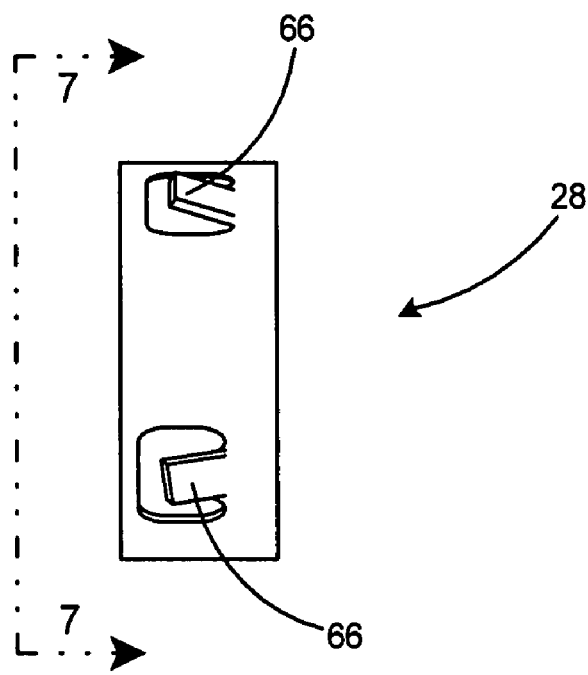
FIG. 6 is a side view of a preferred embodiment of a snap ring that forms a portion of the snap engagement electrical connector of FIG. 2.
Figure 7:
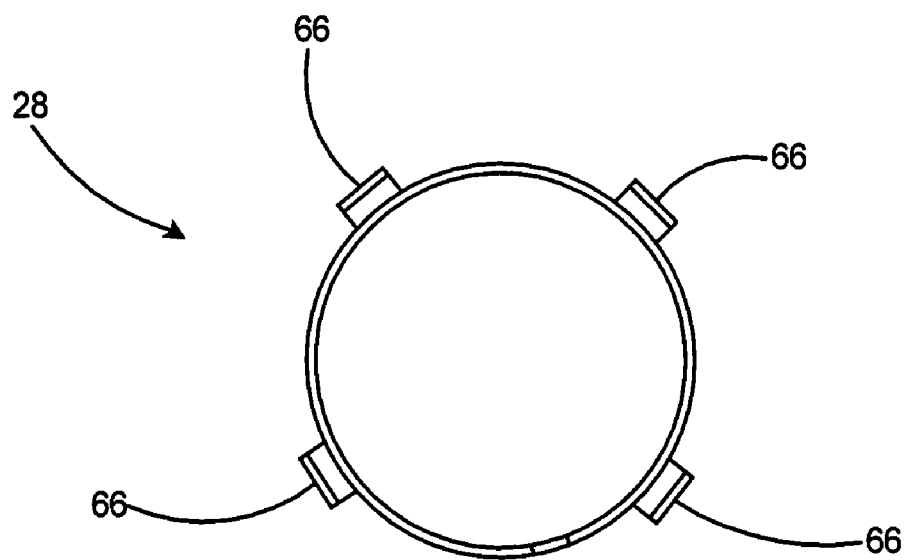
FIG. 7 is an end view of the snap ring taken from line 7-7 of FIG. 6.

With reference to FIGS. 6 and 7 there is shown a preferred embodiment of a snap ring 28 that forms a portion of the snap engagement electrical connector of the present invention. The snap ring 28 is a split ring that includes one or more locking tangs 66 bent outward radially from the outer cylindrical surface of the snap ring 28.

Figure 8:
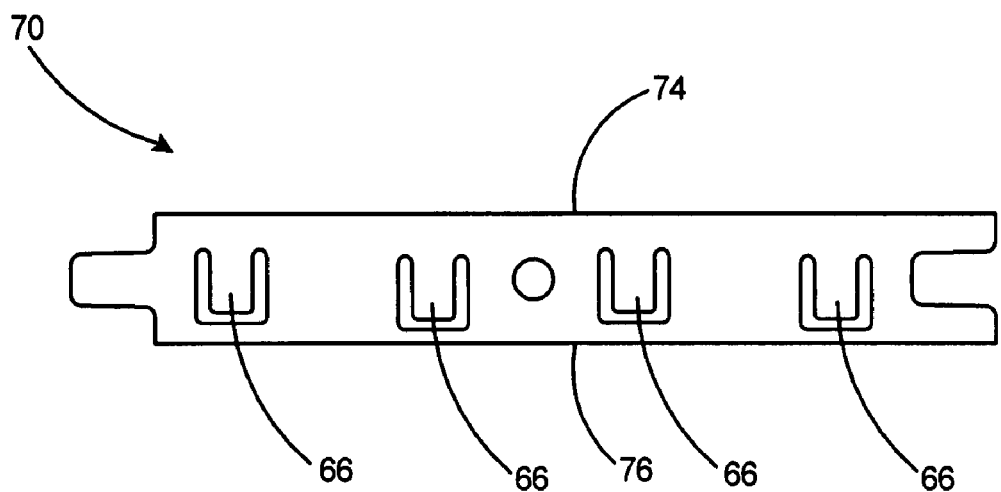
FIG. 8 is a plan view of a blank that will form the snap ring of FIG. 6.
Figure 9:
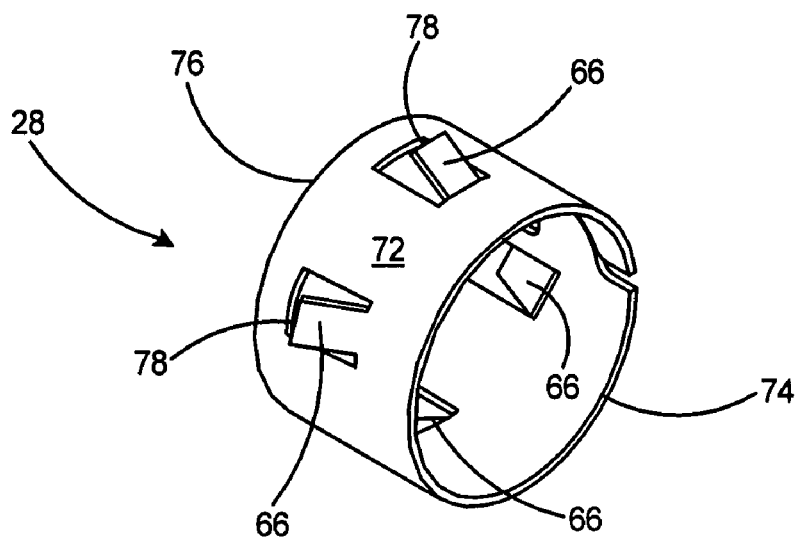
FIG. 9 is a perspective view of the snap ring of FIG. 6.

Referring to FIG. 8, the snap ring is preferably constructed from a flat blank 70 of spring steel. The snap ring is typically stamped from the flat blank 70 of spring steel material. The snap ring 28 is then formed into a substantially cylindrical shape as shown in FIG. 9 and the locking tangs 66 are bent outwards of the outer cylindrical surface 72 of the snap ring 28. The snap ring 28 includes a leading end 74 and a trailing end 76 as shown in FIG. 9 and the free edge 78 of the locking tangs 66 are directed toward the trailing end 76 of the snap ring 28. The preferred embodiment of the snap ring 28 is provided with four locking tangs 66.

Figure 10:
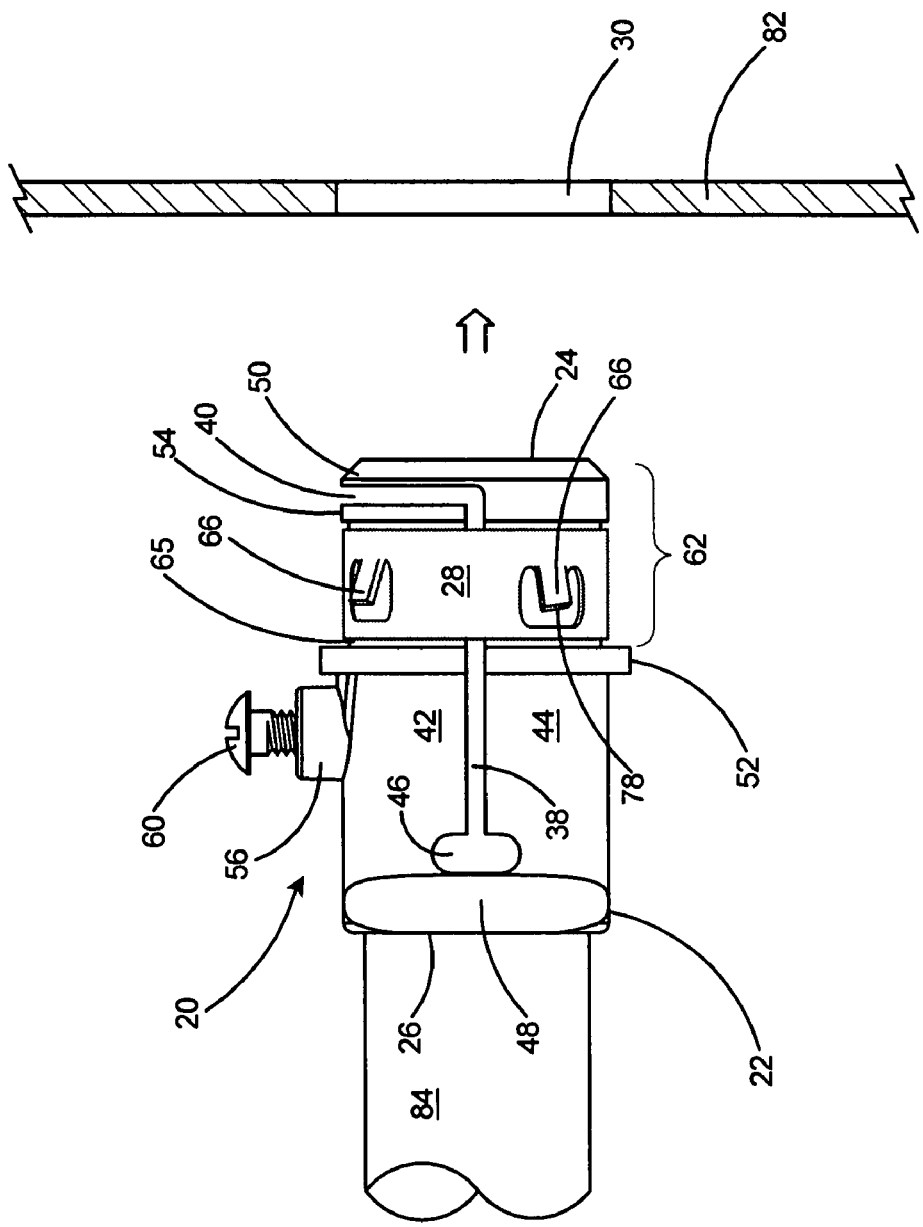
FIG. 10 is a side view of a snap engagement electrical connector according to the present invention shown in alignment with the knockout of a junction box into which it is to be inserted.
Figure 11:
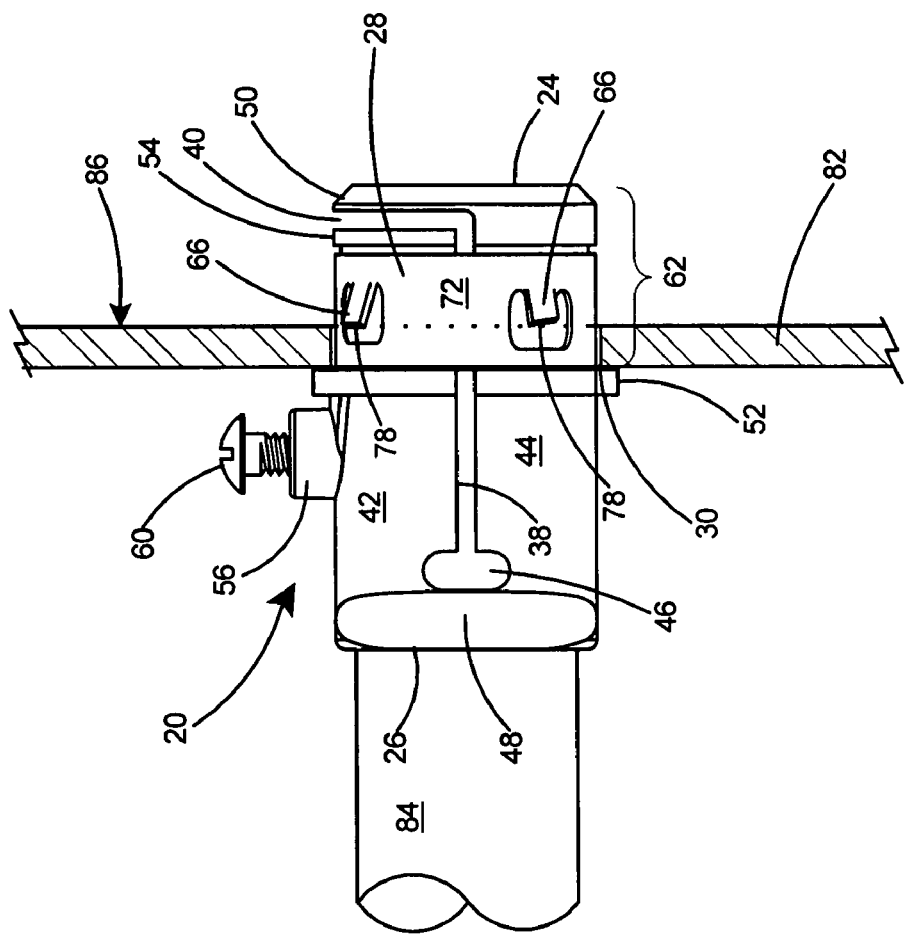
FIG. 11 is a side view of a snap engagement electrical connector according to the present invention after being inserted in the knockout of a junction box.

The reader is referred to FIGS. 10 and 11 for a description of the operation of the snap engagement electrical connector 20 of the present invention. As shown in FIG. 10, the snap engagement electrical connector 20 is provided as an assembly that includes the snap ring 28 disposed on the seat 65 of the leading body portion 62 and held between the leading flange 54 and the central flange 52. The snap ring 28, being constructed of spring steel and formed to a diameter slightly smaller than the diameter of the connector body 22, will snap onto the seat 65 portion of the connector body 22 when slipped over the leading flange 54 and onto the leading end 24 of the connector body 22. The snap ring 28 is then held in place between the leading flange 54 and central flange 52 on the leading end 24 of the connector body 22 to form the snap engagement electrical connector 20 of the present invention.

As shown in FIG. 10, snap engagement electrical connector 20 is aligned with a knockout hole 30 in the wall 82 of a junction box. As a consequence of having a longitudinal slot 38 and a split body, which allows the two halves 42, 44 of the connector body 22 to be pivot away from each other around hinge portion 48, the leading body portion 62 can be constructed with a smaller diameter than the diameter of the knockout hole 30. This is an advantage over prior art solid body connectors as the solid body connectors must have a diameter substantially similar to the diameter of the knockout hole 30 to enable the tangs of the prior art connector (not shown) to secure the solid body connector tightly to the wall.

As shown in FIG. 10, a conduit 84 may be fitted within the trailing end 26 of the connector 20 and held therein by slight pressure on fastener 60. The snap engagement electrical connector 20 of the present invention is then aligned with the knockout hole 30 and the leading body portion 62, including the snap ring 28, are inserted into the hole 30.

As shown in FIG. 11, with the snap engagement electrical connector 20 fully inserted in the knockout hole 30, the connector is held onto the wall 82 by the free edges 78 of the locking tangs 66 engaging the inner side 86 of the wall 82. Although the connector 20 is held onto wall 82 by the locking tangs 66, the connector 20 is not held tight to the wall 82 at this point and the connector 20 may therefore be rotated to place the connector 20 in the desired orientation with respect to the wall 82. Being able to rotate the connector 20 with respect to the wall 82 is a significant advantage to the installer as space may be limited in that area, and changing the orientation of the connector 20 with respect to the wall saves the installer the trouble of having to pry out the connector body, as would likely be required for prior art solid connector bodies.

After the electrical connector 20 is inserted into the knockout hole 30 as shown in FIG. 11, the installer tightens fastener 60 fully upon conduit 84. The pressure of fastener 60 upon conduit 84 causes the upper half 42 of connector body 22 to pivot away from lower half 44. As the upper half 42 of connector body 22 pivots away from lower half 44, snap ring 28, being a split ring, is expanded in diameter until the two halves 42, 44 of the connector 20 force the outer cylindrical surface 72 of the snap ring 28 tightly against the wall 82 at the knockout 30. The snap engagement electrical connector 20 is then held tightly and securely to the wall 82 at the knockout 30 with the free edges 78 of the locking tangs 66 preventing withdrawal of the connector 20 from the knockout hole 30. When tightened, outer cylindrical surface 72 of the snap ring 28 exerts pressure on the wall surrounding the knockout hole 30 and provides excellent electrical continuity or grounding between the connector 20, the electrical metal tubing (EMT) or conduit 84, and the junction box of which the wall portion 82 is shown. If the connector 20 must be repositioned after initial tightening, the installer simply loosens fastener 60 which allows the upper half 42 of the connector to pivot toward the lower half 44 of the connector loosening the leading end 24 of the connector 20 and the snap ring 28 from the wall 82 and thereby allowing the connector 20 to be rotated within the knockout hole 30.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. An electrical connector comprising:
   a tubular die-cast connector body including a leading end having an outer diameter, a trailing end, and a bore having a central axis;
   a longitudinal slot extending through said connector body;
   a fastener in said connector body;
   said fastener orthogonal to said central axis of said bore in said connector body;
   a tubular snap ring disposed on said leading end of said connector body;
   said snap ring a split ring constructed of resilient spring steel, said split ring including an outer cylindrical surface;
   said split ring having an unbiased diameter smaller than said outer diameter of said leading end of said connector body and held thereon on said leading end of said connector body by the tendency of said split ring to return to said unbiased diameter; and
   a locking tang bent outward radially from said outer cylindrical surface of said split ring and directed toward said trailing end of said connector body.

2. The electrical connector of claim 1 including
   a lateral slot in said connector body, said lateral slot extending through said connector body at said leading end; and
   said longitudinal and lateral slots dividing said connector body into an upper half and lower half.

3. The electrical connector of claim 2 wherein
   said connector body includes a threaded bore with said fastener received in said threaded bore; and
   said threaded bore and said fastener are disposed in said upper half of said connector body.

4. The electrical connector of claim 1 including
   a flange dividing said connector body into a leading body portion and a trailing body portion; and
   said flange limiting the distance of insertion of said connector body into a knockout.

5. The electrical connector of claim 1 wherein
said longitudinal slot includes a leading end, and
a second lateral slot at said leading end of said longitudinal slot.

6. The electrical connector of claim 1 including a trailing flange at said trailing end of said connector body.

7. The electrical connector of claim 1 wherein the material of construction of said connector body is selected from the group including steel, zinc, galvanized steel, aluminum, and metal alloys.

8. The electrical connector of claim 1 wherein said split ring includes four of said locking tangs.

9. The electrical connector of claim 1 wherein
said split ring includes a leading end and a trailing end;
said locking tang includes a free end; and
said free end of said locking tang is oriented toward said trail end of said split ring.

10. The electrical connector of claim 1 wherein
said connector body includes a central flange and a leading flange;
said connector body includes a seat between said central flange and said leading flange; and
said split ring is disposed on said seat.

11. An electrical connector comprising:
a rigid one-piece tubular die-cast connector body including a leading end having an outer diameter, a trailing end, and a bore having a central axis;
an upper half on said connector body;
a lower half on said connector body;
said upper half of said connector body hinged to said lower half of said connector body at said trailing end;
a fastener in said connector body;
said fastener orthogonal to said central axis of said bore in said connector body;
a tubular split ring constructed of resilient spring steel and disposed on said leading end of said connector body, said split ring including an outer cylindrical surface;
said split ring having an unbiased diameter smaller than said outer diameter of said leading end of said connector body and held thereon on said leading end of said connector body by the tendency of said resilient split ring to return to said unbiased diameter; and
a locking tang bent outward radially from said outer cylindrical surface of said split ring and directed toward said trailing end of said connector body.

12. The electrical connector of claim 11 wherein said upper half and said lower half of said connector body are defined by a slot extending laterally through said connector body near said leading end and from thence a second slot extending longitudinally through said connector body to a point near said trailing end.

13. The electrical connector of claim 11 wherein said connector body is die-cast from metal alloy.

* * * * *